United States Patent

Berlincourt et al.

[15] 3,676,724

[45] July 11, 1972

[54] MULTI-ELEMENT PIEZOELECTRIC CIRCUIT COMPONENT

[72] Inventors: Don A. Berlincourt, Chagrin Falls; Kendall A. Pim, Cleveland Heights, both of Ohio

[73] Assignee: Vernitron Corporation, Bedford, Ohio

[22] Filed: June 24, 1970

[21] Appl. No.: 49,498

Related U.S. Application Data

[63] Continuation-in-part of Ser. No. 865,365, Oct. 10, 1969, abandoned.

[52] U.S. Cl...............................310/8.2, 310/9.5, 310/9.8, 333/72

[51] Int. Cl...............................H01v 7/00

[58] Field of Search..............................310/8.1, 8.2, 8.3, 8.5, 9.8; 331/116; 317/101; 333/72

[56] References Cited

UNITED STATES PATENTS

| | | | |
|---|---|---|---|
| 3,527,967 | 9/1970 | Dyer et al. | 310/8.2 |
| 3,544,926 | 12/1970 | Hurtig | 310/8.2 X |
| 3,566,166 | 2/1971 | Borner | 310/8.2 |
| 3,576,453 | 4/1971 | Mason | 310/8.2 |
| 3,222,622 | 12/1965 | Curran et al. | 333/72 |
| 3,384,768 | 5/1968 | Shockley et al. | 310/95 |
| 3,437,848 | 4/1969 | Borner et al. | 333/72 X |
| 3,487,318 | 12/1969 | Herman | 310/8.2 X |
| 3,416,036 | 12/1968 | Ho | 317/101 |
| 3,490,055 | 1/1970 | Cox | 333/70 |
| 3,525,944 | 8/1970 | Smith | 310/9.8 X |
| 3,518,573 | 6/1970 | Smith | 310/9.8 X |

*Primary Examiner*—J. D. Miller
*Assistant Examiner*—Mark O. Budd
*Attorney*—Eber J. Hyde

[57] ABSTRACT

There is disclosed a multi-element piezoelectric circuit component comprising a thin wafer of material, at least a part of which is piezoelectric, having two major surfaces whereon a plurality of spaced electrodes and counter electrode means provides in coaction with the intervening material a combination of two or more elements consisting of acoustically isolated coupled mode filters, acoustically isolated resonators and capacitors. Acoustical isolation of the elements can be effected by use of damping or lossy material on the wafer in addition to spacial arrangements of the electrodes. Capacitor elements are formed on a section of the wafer having little or no piezoelectric activity.

21 Claims, 9 Drawing Figures

PATENTED JUL 11 1972 3,676,724

INVENTORS
DON A. BERLINCOURT
KENDALL A. PIM
BY
[signature]
ATTORNEY

MULTI-ELEMENT PIEZOELECTRIC CIRCUIT COMPONENT

CROSS-REFERENCE TO RELATED APPLICATION

This application is a continuation-in-part of application Ser. No. 865,365, filed Oct. 10, 1969, now abandoned.

BACKGROUND OF THE INVENTION

1. Field of the Invention

The present invention relates to a piezoelectric wafer for use as a multi-element circuit component. More particularly, the invention is concerned with a single piezoelectric wafer comprising filter and resonator sections or filter, resonator and capacitor sections, or resonator and capacitor sections.

2. Description of the Prior Art

With the advent of the transistor and its commercial success and acceptance as a substitute for electron tubes, much emphasis has been directed to miniaturization of circuit components.

Piezoelectric wave filters have been miniaturized by establishing a plurality of piezoelectric resonators on a single piezoelectric wafer. Isolated resonators on one wafer, interconnected to form a band-pass filter, are disclosed in U.S. Pat. No. 3,222,622, granted Dec. 7, 1965, to D. R. Curran and A. Berohn. Generally, such filters require additional components, such as transformers and capacitors.

Filters having a plurality of resonators on a single wafer, with separation between adjacent resonators sufficiently small to provide inter-resonator coupling, are described by M. Onoe and H. Jumonji in Electronics and Communications Engineering (Japan) Vol. 48 number 9, Sept. 1965, pp. 85–93, "Analysis of Piezoelectric Resonators Vibrating in Trapped-Energy Modes;" and by R. A. Sykes, W. L. Smith and W. J. Spencer in the 1967 IEEE International Convention Record, Part II, pp. 78–93, "Monolithic Crystal Filters." These now are generally known as coupled mode filters, and represent further simplification of construction. However, manufacturing and performance requirements often dictate the use of at least two coupled mode filter wafers electrically connected in cascade with the addition of a coupling capacitor between each two wafers.

Frequency modulation discriminators (detectors) have been miniaturized by employing two piezoelectric resonators, or a single resonator and a capacitor, plus resistors, in place of tuned transformers.

These improvements have been of considerable value in reducing size and cost of equipment, but the number of components that must be separately manufactured, and then assembled, is still excessive.

It is a principal object of this invention to reduce further the number of separate components required in equipment employing filters, resonators, and discriminators.

Another object is to provide a low-cost miniature, piezoelectric wafer having a combination of circuit elements.

A further object of the invention is to provide a single wafer having a plurality of coupled mode filter sections, each acoustically isolated.

SUMMARY OF THE INVENTION

The above objects and other objects and advantages of the invention have been attained by use of a thin wafer having two major surfaces, and having a piezoelectrically active region and a piezoelectrically inactive region. In the case of ferroelectric crystals or ceramics which are rendered piezoelectrically responsive by applying a high electric field (process termed poling) the inactive region is best provided by leaving unpoled the region of the wafer to be inactive, whereas in the case of quartz and other natural piezoelectric materials, the inactive region is made by mass loading the particular area to move the mechanical resonance of this region outside the passband of filter or resonator elements on the same wafer, or by providing thereon a damping material comprised generally of some epoxy resins or lossy metallic alloys such as solder. This method may also be used with piezoelectric ceramics but the previous method is preferred.

An electrode on one major surface at a piezoelectrically active region, and a counter electrode on the other surface establish a resonator. Additional resonators may similarly be provided, and two or more may be grouped to have acoustic coupling, thereby establishing a filter section. A plurality of such filter sections may be provided, employing physical separation or damping material to prevent acoustic coupling between the sections.

The inactive region hosts one or more capacitor sections. The capacitor section or sections may be used to provide the required electrical coupling between acoustically isolated filter sections on the same wafer. The resonator section or sections may be used as a discriminator, in some cases, in conjunction with an additional capacitor on the same wafer.

The invention will become more clearly apparent by reference to the following description when taken in conjunction with the accompanying drawings.

DESCRIPTION OF THE PREFERRED EMBODIMENTS

Figure 1:
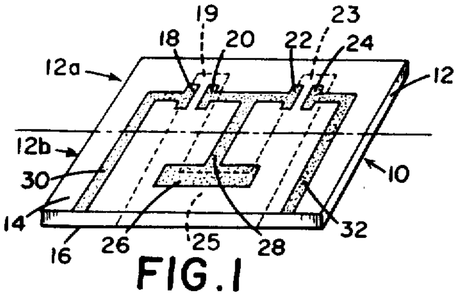
FIG. 1 represents a top view of a piezoelectric wafer having two acoustically isolated two-resonator coupled mode filter sections and a coupling capacitor section.
Figure 2:
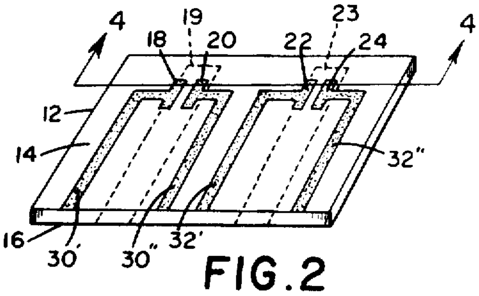
FIG. 2 illustrates a piezoelectric wafer having two acoustically isolated coupled mode filters, each consisting of two coupled resonators.
Figure 3:
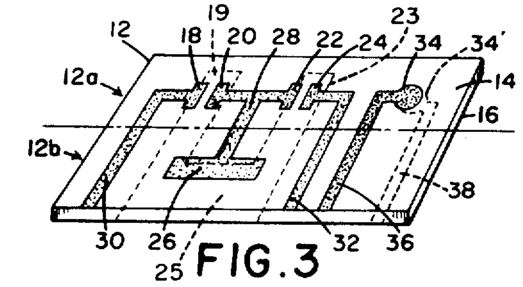
FIG. 3 shows a combination of two acoustically isolated two-resonator coupled mode filter sections, a coupling capacitor and an acoustically isolated resonator on a single piezoelectric wafer.

Referring now to FIGS. 1, 2, and 3, the circuit component comprises a thin, flat wafer or plate 12 of material having two major surfaces 14 and 16.

Specifically, FIG. 1 shows an embodiment in accordance with the invention wherein wafer 12 is divided into two regions, 12*a* and 12*b*. Region 12*a* is piezoelectrically active and region 12*b* is piezoelectrically inactive. Wafer 12 is made of ceramic material which can be rendered piezoelectric by exposure to a high dc electric field (process called poling). Thus, region 12*a* represents the poled area of the ceramic and region 12*b* represents the unpoled area. Major surface 14 is provided with two electrode pairs 18, 20 and 22, 24; and surface 16 is provided with counter electrode means 19, 23 connected together by counter electrode 25. Each electrode and corresponding counter electrode means coact with the intervening piezoelectric material of wafer 12 to form a resonator element.

It is not necessary for all portions of region 12*a* to be polarized. Piezoelectric activity is required only in the material between and immediately surrounding the electrodes. Thus, for example, suitable polarization may be accomplished through temporary electrodes covering a region a little beyond 18, 20 and 22, 24. For best results, the capacitor area 26 must not be poled.

In FIG. 1 the two resonator elements formed by electrode pair 18, 20, together with counter electrode 19, form one coupled mode filter section and the two resonator elements formed by electrode pair 22, 24, together with counter electrode 19, provide a second coupled mode filter section. The two-resonator coupled mode filter sections are acoustically isolated from one another. Acoustical isolation of the filter sections can be accomplished by either providing sufficient amount of damping material between them or by spacial arrangement of the electrodes, i.e., placing the electrodes comprising the particular filter section sufficiently apart from another set of electrodes.

The couple mode filter sections can be electrically coupled together either by a resistor, a capacitor, or a gain stage. It is preferrable that a capacitor be used because resistive coupling causes loss or attenuation and with the gain stage slight acoustic leakage between the filter sections might cause undesirable oscillation.

It is also preferrable, but not essential, that the coupling capacitor be provided by registered electrodes on the same wafer. In this case, however, the capacitor must not be piezoelectrically active in or close to the frequency range of the filter passband. With piezoelectric ceramic materials or most ferroelectric crystals this is easily achieved by leaving unpoled the area provided for the capacitor. In FIG. 1, unpoled region **12*b* is provided with capacitor electrode 26 opposite a counter electrode 25 and is electrically coupled to the filter sections through connection 28. Leads 30 and 32 provide connecting means to the electric circuit, one acting as input and the other as output for the filter. The common external connection is made to counter electrode 25, which is formed integrally with counter electrodes 19, 23**. Electrical connection to the external circuit is accomplished at or close to the edge of the wafer well away from the range of significant acoustic vibration of all resonator elements. The connection points are therefore also acoustically isolated from the resonators. Connections may be made by conducting epoxy, such as silver-loaded epoxy, by solder, or by a bonding procedure as used with integrated circuits.

The vibratory modes of the resonators are generally thickness modes, either thickness shear or thickness extensional. Thus, wafer 12, as represented in the drawings, can be made from a variety of materials comprising natural piezoelectric crystals, such as quartz or zinc oxide, and polarizable ferroelectric ceramic material such as barium titanate, lead zirconate-lead titanate, and modifications thereof, or polarizable ferroelectric crystals such as lithium tantalate or lithium niobate. It should be understood, however, that with natural piezoelectric material, such as quartz, the unpoled region 12b does not exist, in which event damping or loading material is utilized to prevent the capacitor region 26 from exhibiting piezoelectric response near the passband of the filter. The damping material should have a fairly high stiffness to provide a reasonable acoustic match to the wafer. Also, the damping material should be fairly lossy, i.e., its mechanical quality factor $Q_m$ should be small compared to that of the wafer. Epoxy compounds have been found to be good damping material. Sufficient loading with a high $Q_m$ material can also accomplish this purpose by physically shifting the mechanical resonance. Materials with low $Q_m$ are preferred because they not only shift resonance but also reduce resonant response.

Referring now to FIG. 2, there is shown a circuit component comprising a thin piezoelectric wafer 12 identical to that shown in FIG. 1, but having only two acoustically isolated two-resonator coupled mode filter sections, without a capacitor. Since there is no capacitor, the entire wafer may be piezoelectrically active. Each filter section has separate connecting leads 30', 30'', with counter electrode 19; and 32', 32'', with counter electrode 23.

FIG. 3 is a circuit component, similar to 10 in FIG. 1; and, in addition, it has a resonator section formed by electrode 34 on major surface 14 and a counter electrode means 34' on major surface 16. The resonator section can operate as part of a discriminator in frequency modulation receivers, adding to the advantage of having miniaturized circuit components with a minimum of separate parts to assemble. The resonator section defined by electrode 34 and counter electrode means 34' having leads 36, 38 must be acoustically isolated from the coupled mode filter sections either by sufficient space on the wafer or by providing damping material or lossy deposit in between to insure acoustical isolation.

Figure 3A:
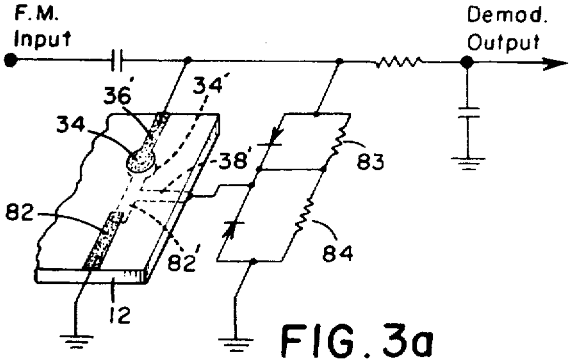
FIG. 3*a* shows a modification of the right-hand portion of FIG. 3 connected in a suitable FM discriminator circuit.

Further simplification of an FM receiver may be obtained by adding a capacitor to the right-hand portion of the wafer of FIG. 3, as shown in FIG. 3*a*. The capacitor is formed by electrode 82 and counter electrode 82' on the piezoelectrically inactive portion of the wafer and replaces a separate capacitor that would otherwise be used in the FM discriminator circuit. A suitable circuit is shown in FIG. 3*a*. By suitably relating the areas of the resonator electrodes for the filter and the discriminator, the center frequency of the filter passband may be made to fall midway between the resonance and antiresonance frequencies of the discriminator resonator. By selecting suitable areas for capacitor electrodes 82, 82' and suitable values for resistors 83, 84, the discriminator circuit can be made to null at this midway frequency. For design information relating to the adjustment of resonance frequency by electrode area, reference may be made to the book "-Design of Resonant Piezoelectric Devices," by Richard Holland and E. P. Eernisse, Research Monograph No. 56, The M.I.T. Press, Cambridge, Massachusetts.

The discriminator portion shown in FIG. 3*a* may, if desired, be produced on a separate wafer.

Figure 4:
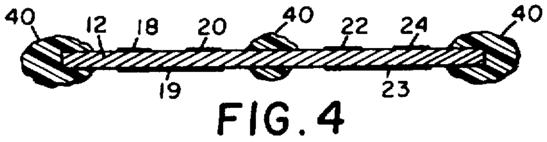
FIG. 4 is a cross section along the line 4—4 of the wafer of FIG. 2 showing damping material for acoustic isolation.

FIG. 4 is a cross section of a circuit component, similar to that shown in FIG. 2, but also depicting damping material 40 which may be added to provide or improve acoustic isolation.

In FIGS. 2–5 the two filter sections shown on the wafer have resonators that are nearly identical, so passband characteristics and center frequencies coincide. By utilizing resonators of different areas in the two sections, or by applying more electrode mass loading on one filter section, however, filters with different passband characteristics and different center frequencies can be provided.

Figure 5:
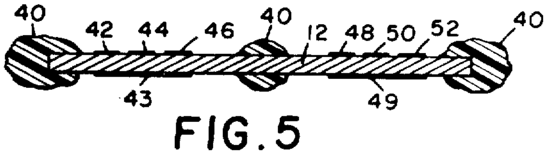
FIG. 5 illustrates a cross section of a piezoelectric wafer having two acoustically isolated coupled mode filters, each consisting of three coupled resonators and damping material.

FIG. 5 is a cross section of a circuit component having two acoustically isolated filter sections, each comprising three resonators identified by electrodes 42, 44, 46, and counter electrode means 43 for the first and electrodes 48, 50, 52, and counter electrode means 49 for the second. Damping material 40 is provided for acoustical isolation.

Generally, the design of the filter will require a short circuit across the central resonator of each filter section. Thus, electrode 44 would be connected to electrode 43, and electrode 50 would be connected to electrode 49. This may be done externally, or by conductors on surfaces of the wafer, similar to 32 of FIG. 3, for example, joined at the edge of the wafer.

Figure 6:
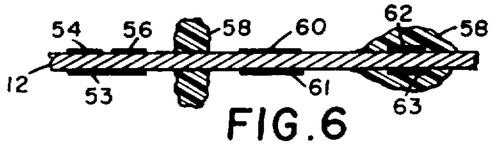
FIGS. 6, 7, and 8 illustrate other embodiments of the invention.
Figure 7:
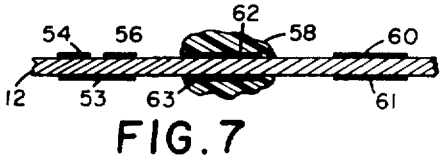

FIGS. 6 and 7 illustrate different arrangements of the various elements on the piezoelectric wafer. In FIG. 6 a cross section of a natural piezoelectric wafer is shown comprising a coupled mode filter section formed by electrodes 54 and 56 and counter electrode means 53; a resonator section formed by electrode 60, and counter electrode means 61, and a capacitor element formed by electrode 62, and counter electrode means 63. The coupled mode filter section and resonator section described above are separated by damping material 58 to provide acoustical isolation. As to the capacitor section, the area is made inactive piezoelectrically by depositing damping material over the entire capacitor section.

FIG. 7 illustrates a different arrangement from FIG. 6 in that the capacitor is positioned in between the coupled mode filter section and the resonator section. The capacitor section being covered by the damping material provides an inactive region which in turn provides acoustical isolation between the filter and the resonator sections.

Figure 8:
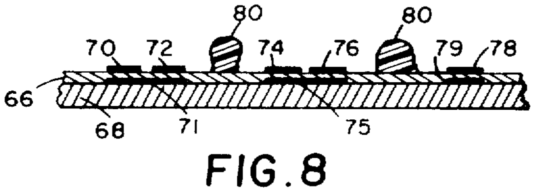

FIG. 8 is yet another embodiment of the invention which provides the same advantages as hereinbefore described, but utilizing a different structural arrangement. Polycrysstalline non-ferroelectric materials composed of class II–VI dihexagonal polar crystals have been known to have piezoelectric properties. (See U.S. Pat. No. 3,409,464 to L. R. Shiozawa). Thus, wafer 12 in FIGS. 1–7 can be substituted by a thin layer 66 over substrate 68, said layer being piezoelectric and formed from polycrystalline non-ferroelectric material selected from the group consisting of cadmium sulfide, cadmium selenide, zinc oxide, beryllium oxide, wurtzite zinc sulfide, and solutions thereof. Substrate 68 can be of piezoelectric material such as quartz or non-piezoelectric material such as glass. Electrode pairs 70, 72 and 74, 76 form with counter electrode means 71 and 75 two acoustically isolated filter sections, each consisting of two coupled resonators. Electrode 78 and counter electrode 79 form an acoustically isolated resonator section on the same layer. Damping material 80 provides the acoustical isolation necessary. In this connection, mention should be made of the fact that FIGS. 1–8 are not drawn to scale. In particular, more separation may be required between the damping material and the neighboring resonator sections. Furthermore, wafer thickness is much less than shown in all figures. Generally, resonator electrodes have lateral dimensions of the order of two to 10 times the thickness of the wafer.

It is to be understood that, while the invention has been described in conjunction with certain specific embodiments, the scope of the present invention is not to be limited thereby except as defined in the appended claims.

What is claimed is:

1. A circuit component comprising: a thin wafer of material having two major surfaces and having a piezoelectrically active region and an inactive region; at least three spaced electrodes, each positioned on an active region of one major surface of said wafer, and counter electrode means positioned on the opposite major surface of said wafer in opposition to said electrodes, said electrodes and counter electrode means coacting with the intervening piezoelectric material to form at least three resonator elements with at least two resonator elements being acoustically coupled to form at least one coupled mode filter and at least one resonator element being acoustically isolated from said coupled mode filter; at least one electrode on an inactive region of said wafer and counter electrode means positioned in opposition to said electrode, said electrode and counter electrode means forming at least one capacitor element.

2. A circuit component as claimed in claim 1 wherein said wafer is formed from ferroelectric ceramic material and said resonator elements having a thickness mode of vibration.

3. A circuit component as claimed in claim 1 wherein said wafer is formed from natural piezoelectric crystals and said resonator elements having a thickness mode of vibration.

4. A circuit component as claimed in claim 1 wherein said wafer is formed from polycrystalline non-ferroelectric material selected from the group consisting of cadmium sulfide, cadmium selenide, zinc oxide, beryllium oxide, wurtzite zinc sulfide, and solid solutions thereof; and said resonator elements having a thickness mode of vibration.

5. A circuit component as claimed in claim 1 wherein said wafer is formed from ferroelectric crystals.

6. A circuit component as claimed in claim 2 wherein said inactive region comprises the unpoled area of said wafer.

7. A circuit component as claimed in claim 3 wherein said wafer is provided with sufficient damping material to form the inactive region of said wafer.

8. A circuit component as claimed in claim 7 wherein said wafer is provided with sufficient mass loading to form the inactive region of said wafer.

9. A circuit component as claimed in claim 7 wherein said damping material is formed from epoxy resin.

10. A circuit component comprising: a thin wafer of material having two major surfaces and having a piezoelectrically active region and an inactive region, at least two groups of electrodes, each group of electrodes consisting of at least two spaced electrodes, each group positioned on an active region of one major surface of said wafer and counter electrode means positioned on the opposite major surface of said wafer in opposition to said electrodes, said electrodes and counter electrode means coacting with the intervening piezoelectric material to form at least two groups of acoustically coupled resonator elements to form at least two coupled mode filters acoustically isolated from each other; at least one electrode positioned on an inactive region of said wafer and counter electrode means positioned in opposition to said electrode, said electrode and counter electrode means forming at least one capacitor element.

11. A circuit component as claimed in claim 10 wherein said wafer is formed from ferroelectric ceramic material and said resonator elements having a thickness mode of vibration.

12. A circuit component as claimed in claim 10 wherein said wafer is formed from natural piezoelectric crystals and said resonator elements having a thickness mode of vibration.

13. A circuit component as claimed in claim 10 wherein said wafer is formed from polycrystalline non-ferroelectric material selected from the group consisting of cadmium sulfide, cadmium selenide, zinc oxide, beryllium oxide, wurtzite zinc sulfide, and solid solutions thereof; and said resonator elements having a thickness mode of vibration.

14. A circuit component as claimed in claim 10 wherein said wafer is provided with sufficient damping material to form the inactive region of said wafer.

15. A circuit component as claimed in claim 11 wherein said inactive region comprises the unpoled area of said wafer.

16. A circuit component comprising: a thin wafer of material having two major surfaces and having a piezoelectrically active region and an inactive region, at least one electrode positioned on the active region of one major surface of said wafer and counter electrode means positioned on opposite major surface of said wafer in opposition to said electrode, said one electrode and counter electrode means coacting with the intervening piezoelectric material to form at least one resonator element, at least one electrode positioned on the inactive region of one major surface of said wafer and counter electrode means positioned on opposite major surface of said wafer in opposition to said electrode to form at least one capacitor element.

17. A circuit component as claimed in claim 16 wherein said wafer is formed from ferroelectric ceramic material, and said resonator element having a thickness mode of vibration.

18. A circuit component as claimed in claim 17 wherein said inactive region comprises the unpoled area of said wafer.

19. A circuit component as claimed in claim 16 wherein said wafer is formed from natural piezoelectric crystals and said resonator element having a thickness mode of vibration.

20. A circuit component as claimed in claim 16 wherein said wafer is formed from a crystal selected from the group consisting of quartz, zinc oxide, lithium niobate, and lithium tantalate; and said resonator elements having a thickness mode of vibration.

21. A circuit component as claimed in claim 19 wherein said wafer is provided with sufficient damping material to form the inactive region of said wafer.

* * * * *